United States Patent
Ishii et al.

(10) Patent No.: US 10,430,041 B2
(45) Date of Patent: Oct. 1, 2019

(54) INFORMATION COLLECTION SYSTEM, INFORMATION COLLECTION TERMINAL DEVICE, INFORMATION COLLECTION SERVER, AND INFORMATION COLLECTION METHOD

(71) Applicant: YOKOGAWA ELECTRIC CORPORATION, Tokyo (JP)

(72) Inventors: Yosuke Ishii, Tokyo (JP); Yukiyo Akisada, Tokyo (JP); Kenji Oishi, Tokyo (JP)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 451 days.

(21) Appl. No.: 15/163,930

(22) Filed: May 25, 2016

(65) Prior Publication Data

US 2016/0364104 A1 Dec. 15, 2016

(30) Foreign Application Priority Data

Jun. 11, 2015 (JP) ................................. 2015-117989

(51) Int. Cl.
*G06F 3/0484* (2013.01)
*G06Q 10/06* (2012.01)
*H04L 12/26* (2006.01)

(52) U.S. Cl.
CPC .......... *G06F 3/0484* (2013.01); *G06Q 10/06* (2013.01); *H04L 43/045* (2013.01)

(58) Field of Classification Search
CPC ...... G06F 3/0484; G06Q 10/06; H04L 43/045

USPC ................................. 709/204, 217, 223, 224
See application file for complete search history.

(56) References Cited

U.S. PATENT DOCUMENTS

| 2002/0103620 | A1 | 8/2002 | Hayashi et al. | |
|---|---|---|---|---|
| 2005/0164684 | A1* | 7/2005 | Chen | G05B 19/0423 455/414.1 |
| 2005/0182650 | A1* | 8/2005 | Maddox, Jr. | G06Q 10/06 705/305 |
| 2007/0244715 | A1 | 10/2007 | Baptista et al. | |

(Continued)

FOREIGN PATENT DOCUMENTS

| EP | 2665251 A2 | 11/2013 |
|---|---|---|
| GB | 2422234 A | 7/2006 |
| JP | 11353332 A | 12/1999 |

(Continued)

*Primary Examiner* — Chirag R Patel
*Assistant Examiner* — Marshall M McLeod
(74) *Attorney, Agent, or Firm* — Sughrue Mion, PLLC (57) ABSTRACT

An information collection system includes an information collection terminal and an information collection server. The an information collection terminal includes an obtainer configured to obtain specification information for specifying a non-connection device which is not connected to a system which is capable of collecting information, a display configured to display an information input screen according to the specification information, an input device configured to input information of the non-connection device into the information input screen, and a communicator configured to transmit, to a network, input information which has been input into the information input screen. The information collection server includes a first collector configured to collect the input information transmitted from the information collection terminal through the network.

18 Claims, 8 Drawing Sheets

| DEVICE TAG ID | SHIFT | SCREEN ID |
|---|---|---|
| T1000 | DAY WORK | 1 |
| | NIGHT WORK | 2 |
| F2000 | DAY WORK | 1 |
| | NIGHT WORK | 3 |
| ⋮ | ⋮ | ⋮ |

(56) References Cited

U.S. PATENT DOCUMENTS

2012/0046911 A1    2/2012  Mathiowetz et al.

FOREIGN PATENT DOCUMENTS

| JP | 2002140660 A | 5/2002 |
| JP | 2002189647 A | 7/2002 |
| JP | 2002202810 A | 7/2002 |
| JP | 2002366566 A | 12/2002 |
| JP | 200932206 A | 2/2009 |

* cited by examiner

| DEVICE TAG ID | SHIFT | SCREEN ID |
|---|---|---|
| T1000 | DAY WORK | 1 |
| | NIGHT WORK | 2 |
| F2000 | DAY WORK | 1 |
| | NIGHT WORK | 3 |
| ⋮ | ⋮ | ⋮ |

INFORMATION COLLECTION SYSTEM, INFORMATION COLLECTION TERMINAL DEVICE, INFORMATION COLLECTION SERVER, AND INFORMATION COLLECTION METHOD

BACKGROUND

Technical Fields

The disclosure relates to an information collection system, an information collection terminal device, an information collection server, and an information collection method.

Priority is claimed on Japanese Patent Application No. 2015-117989, filed Jun. 11, 2015, the contents of which are incorporated herein by reference.

Related Art

In a plant and a factory (hereinafter called simply "plant" as a generic name of them), a DCS (Distributed Control System) is established, and an advanced automatic operation is implemented. In the distributed control system, field devices for example, a measurement device, a manipulation device, a display device, an alarm device, and other devices) and a controller controlling the field devices are connected to each other through a network. In the plant in which the distributed control system is established, a plant information management system (PIMS) is often installed in order to easily manage huge amount of data (for example, process data) collected in the plant. The plant information management system has stored the collected data for a long time, and provides it in a necessary format whenever needed.

In some cases, a computerized maintenance management system (CMMS) or a system called as an enterprise asset management (EAM) is installed in the plant in order to support maintenance of facilities installed in the plant. Each of these systems unitarily manages information about maintenance of facilities. Moreover, in some cases, an integrated device management system called as an enterprise resource planning (ERP) is installed in the plant in order to integrally manage various resources about the plant and to improve efficiency and optimization of work.

In the plant where various types of production systems are established, maintenance works of various devices (including field devices and various facilities are conducted periodically or non-periodically in view of preventing abnormal operation and maintaining performance. For example, maintenance of the field device is conducted by using a terminal device which can perform wired communication or wireless communication with the field device. Specifically, at a time of the maintenance of the field device, for example, a worker operates the terminal device to read and check contents of device information (parameter) which has been set to the field device which is a maintenance target, and the worker operates the terminal device to set new device information to the field device. An example of the terminal device is disclosed in U.S. Unexamined Patent Application Publication No. 2012/0046911.

By the way, at a time of maintenance conducted periodically or non-periodically, it is necessary to check various types of devices and facilities installed in the plant. For example, in a case of a manual valve and a pipeline which are installed in the plant, it is necessary to check a position of a lever or a handle for opening and closing the valve, check inside and outside of the pipeline with eyes, diagnose sound, and so on. Although various types of meters are arranged in the plant, it is also necessary to check indicated values of these meters at the time of maintenance. For this reason, under the present circumstances, there are problems described below.

(1) It may be difficult to collect information at a field of the plant.

In a case of a field device which has communication function for communicating with the terminal device, the terminal device can obtain information of the field device without any problem. However, the terminal device cannot obtain information of the field device which does not have the communication function. Even if the field device has the communication function, in a case of the field device, which performs wired communication, it is necessary to connect the terminal device to the field device by using a connection line. For the reason, it takes much time for obtaining a lot of information of the field device installed in the field.

For example, if the terminal device has a function of creating a memo representing contents which the worker checked, the terminal device can collect information of a field device which does not have the communication function, a valve, a pipeline, and various types of meters (hereinafter, a device or a facility which is not connected to a production system is called "non-connection device"). However, since the information collected by the method is different in a form from the information collected by using the communication function and the information cannot be integrated, the information cannot be used effectively.

(2) Unnecessary cost is required.

According to the situation of the above-described (1), a worker records a check result (for example, a check with eyes, and sound diagnosis) on paper media (for example, check sheet or work record) in many plants at a time of maintenance work. Contents which the worker recorded on the paper medium are manually input into a computer by a responsible person (boss) and the worker. If the contents recorded on the paper medium are unclear, or if an error in the contents recorded on the paper medium is found, the check work may be needed. Thus, under the present circumstances, since inefficient works requiring much time is conducted, unnecessary cost is required.

(3) A human error is easy to occur.

Although information is automatically collected from the field device which has the communication function, a lot of manual work is needed in order to collect information from the non-connection device. Thus, if a lot of manual work is needed, a human error is easy to occur. As the result, work efficiency and production efficiency are worsened, and a large loss arises.

SUMMARY

An information collection system includes an information collection terminal and an information collection server. The an information collection terminal includes an obtainer configured to obtain specification information for specifying a non-connection device which is not connected to a system which is capable of collecting information, a display configured to display an information input screen according to the specification information, an input device configured to input information of the non-connection device into the information input screen, and a communicator configured to transmit, to a network, input information which has been input into the information input screen. The information collection server includes a first collector configured to collect the input information transmitted from the information collection terminal through the network.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an information collection system, an information collection terminal device, an information collection server, and an information collection method which can prevent unnecessary cost and a human error, and can collect information of the non-connection device installed in the plant.

Hereinafter, with reference to drawings, an information collection system, an information collection terminal device, an information collection server, and an information collection method of embodiments of the present invention will be described in detail.

[Information Collection System]

Figure 1:
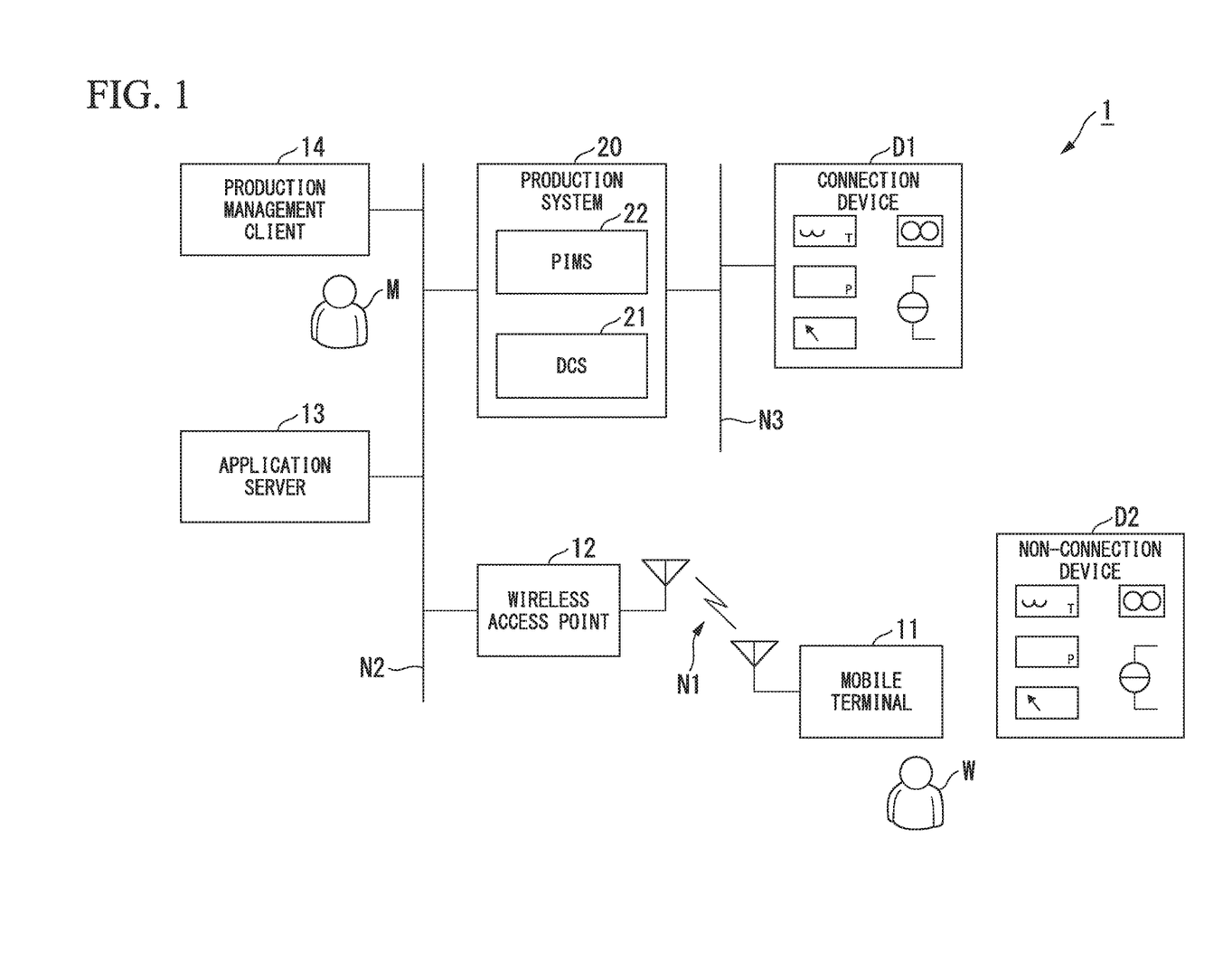
FIG. 1 is a block diagram illustrating a whole configuration of an information collection system of an embodiment of the present invention.

FIG. 1 is a block diagram illustrating a whole configuration of an information collection system of an embodiment of the present invention. As shown in FIG. 1, the information collection system 1 of the present embodiment is equipped with a mobile terminal 11 (information collection terminal), a wireless access point 12, an application server 13 (information collection server), and a production management client 14 (production management terminal). The information collection system 1 collects information about a connection device D1 which is connected to the production system 20 established in the plant, and information about a non-connection device D2 which is not connected to the production system 20. Then, the information collection system 1 performs analysis which is necessary for production management by using the collected information.

As shown in FIG. 1, the mobile terminal 11 and the wireless access point 12 are connected through a wireless network N1 (network). The wireless access point 12, the application server 13, the production management 14, and the production system 20 are connected to an intranet N2. The production system 20 and the connection device D1 are connected to a control network N3.

The wireless network N1 is established in a field of the plant by the wireless access point 12. The wireless network N1 can communicate wirelessly in conformity with a wireless communication standard, such as Wi-Fi (registered trademark), WiMAX (registered trademark), and 3G/LTE (registered trademark). The intranet N2 is a network such as Ethernet (registered trademark) established in a monitoring room of the plant. The control network N3 is established in the field of the plant, for example. The control network N3 is a wired or wireless industrial network such as HART (registered trademark), FieldBus, ISA100.11a, and so on.

Here, in an example shown in FIG. 1, a distributed control system (DCS) 21 and a plant information management system (PIMS) 22 are shown as the production system 20. A computerized maintenance management system (CMMS) an enterprise asset management system (EAM) and an enterprise resource planning system (ERP) may be included in the production system 20, in addition to the distributed control system (DCS) 21 and the plant information management system (PIMS) 22. The production system 20 may also be a single device.

The connection device D1 is connected to the production system 20 through the control network N3. The connection device D1 is a field device FD such as a sensor device (for example, a flowmeter and a temperature sensor), a valve device (for example, a flow control valve and an on-off valve), an actuator device (for example, a fan and a motor), and other devices installed in the field of the plant and communicates with a controller (not illustrated) which is a main part of the DCS 21. The non-connection device D2 does not have a communication function, and is not connected to the production system 20. For example, the non-connection device D2 includes a manual valve, a pipeline, various types of meters (for example, an analog meter, and an analysis meter), and a switch, which are installed in the plant.

The mobile terminal 11 is a terminal device used in order to collect information about the non-connection device D2 installed in the plant. The mobile terminal 11 is used by a worker W (user) who conducts field works of the plant. For example, the mobile terminal 11 is a smart phone or a tablet type computer. However, in a case of a terminal device equipped with functions of collecting information about the non-connection device D2, arbitrary terminal devices (for example, a spectacle-type terminal device or a watch-type terminal device) can be used. Details of the mobile terminal 11 will be described later.

The wireless access point 12 establishes the wireless network N1 described above. The wireless access point 12 relays data which is transmitted and received through the wireless network N1 and data which is transmitted and received through the intranet N2. By the wireless access point 12 being installed, the mobile terminal 11 and the application server 13 can communicate with each other. In the present embodiment, in order to explain simply, the wireless access point 12 which connects the wireless network N1 to the intranet N2 directly is described as an example, but the wireless access point 12 may be a relay device for connecting with the intranet N2 via public lines, such as 3G (third generation mobile communication system) or 4G (fourth generation mobile communication system).

The application server 13 collects the information about the connection device D1 from the production system 20, and collects the information about the non-connection device D2 from the mobile terminal 11. The application server 13 provides various types of applications to the mobile terminal 11 and the production management client 14. If function and operation described later can be realized, arbitrary methods (for example, Web service/application such as HTML5) can be used by the application server 13 as a method of providing data and application. If the application server 13 has function described later, arbitrary device (a personal computer, a rack-mounted server, and so on) can be used. Otherwise, the application server 13 may be realized as cloud computing. Details of the application server 13 will be described later.

The production management client 14 is operated by a manager M of the plant. For example, the production management client 14 is used in order to perform analysis which is necessary for production management by using various types of information collected by the application server 13. For example, the production management client 14 is realized as a desktop computer, a laptop computer, or a notebook computer. If the above-described analysis is performed by using the application server 13, for example, commercial spreadsheet software or dedicated software may be used. Details of the production management client 14 will be described later.

[Information Collection Terminal Device]

Figure 2:
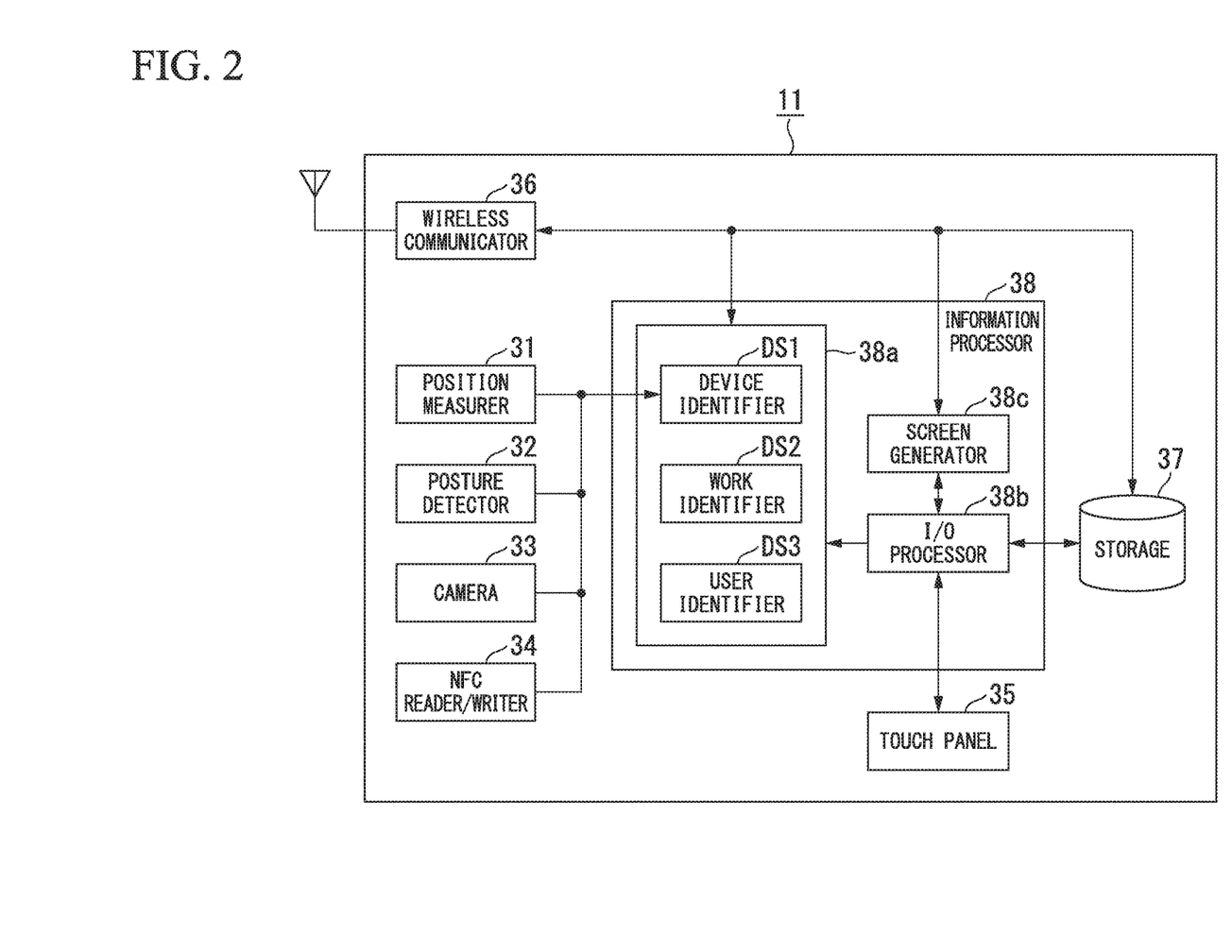
FIG. 2 is a block diagram illustrating a main configuration of the mobile terminal as an information collection terminal device of an embodiment of the present invention.

FIG. 2 is a block diagram illustrating a main configuration of the mobile terminal as an information collection terminal device of an embodiment of the present invention. As shown in FIG. 2, the mobile terminal 11 is equipped with a position measurer 31 (obtainer, position information obtainer), a posture detector 32 (obtainer), a camera 33 (obtainer, image obtainer), an NFC reader/writer 34 (obtainer, short-distance communicator), a touch panel 35 (display, input device), a wireless communicator 36 (communicator), a storage 37, and an information processor 38.

The position measurer 31 measures a position of the mobile terminal 11. Specifically, the position measurer 31 receives electric wave from a satellite used by a global positioning system (GPS), and the position measurer 31 performs signal processing to the received signal in order to measure the position of the mobile terminal 11. If the position measurer 31 can measure the position of the mobile terminal 11, the position measurer 31 is not limited to the GPS, and an arbitrary positioning method can be used.

The posture detector 32 is equipped with a gyroscope sensor, a geomagnetism sensor (electronic compass), and so on. The posture detector 32 detects posture and direction of the mobile terminal 11. If the detection result of the posture detector 32 is used, for example, a photographing direction of the camera 33 can be specified. The camera 33 is equipped with a solid-state image sensing device, such as CCD (Charge Coupled Device) and CMOS (Complementary Metal Oxide Semiconductor). The camera 33 can take a still image and a moving image.

The NFC reader/writer 34 supplies electric power by non-contact to an external device (for example, an NFC tag which is not illustrated and disposed near the non-connection device D2). Moreover, the NFC reader/writer 34 performs NFC (Near Field Communication: short-distance communication) with the external device, and the NFC reader/writer 34 reads data out of the external device or writes data into the external device. Here, the NFC means communication (non-contact communication) which becomes possible, for example, if a distance between devices which communicate with each other is several tens of centimeters or less. The NFC also includes communication performed in a state that cases of devices which communicate with each other are contacted.

The touch panel 35 is an operation display which includes a display (for example, a liquid crystal display, and an organic EL (Electro Luminescence) display) and a position input device (for example, a touchpad). The wireless communicator 36 can communicate wirelessly in conformity with a wireless communication standard, such as Wi-Fi (registered trademark), WiMAX (registered trademark), and 3/LTE (registered trademark). The wireless communicator 36 communicates through the wireless network N1. The storage 37 stores various types of information used by the information processor 38, various types of information received by the wireless communicator 36, and so on. For example, the storage 37 is realized by a memory device such as a semiconductor memory or a recording device such as a hard disk.

The information processor 38 is equipped with an identifier 38a, an I/O processor 38b and a screen generator 38c. The information processor 38 performs processing which is necessary to collect information about the non-connection device D2 installed in the plant. Specifically, the information processor 38 specifies the non-connection device D2 installed in the plant. The information processor 38 displays, on the touch panel 35, an information input screen which is necessary to collect information about the specified non-connection device D2. The information processor 38 outputs, to the wireless communicator 36, input information which is input to the information input screen.

The identifier 38a is equipped with a device identifier DS1 (obtainer, reader), a work identifier DS2, and a user identifier DS3. The identifier 38a performs various types of identification processing which are necessary to select information input screen which is to be displayed on the touch panel 35. The device identifier DS1 identifies the non-connection device D2 which is a collection target of information by using at least one of a measurement result of the position measurer 31, a detection result of the posture detector 32, an image obtained by the camera 33, and data read by the NFC reader/writer 34. By this processing, a device tag ID (specification information) for specifying the non-connection device D2 is obtained. For example, the device identifier DS1 performs the first identification processing to the third identification processing which are shown below.

<First Identification Processing>

The first identification processing is processing of identifying (specifying) the non-connection device D2 displayed on the touch panel 35 by using a measurement result of the position measurer 31 (position information of the mobile terminal 11), a detection result of the posture detector 32 (posture or direction of the mobile terminal 11), a viewing angle of the camera 33, and position information of the non-connection device D2. Otherwise, the first identification processing may be processing of identifying (specifying) the non-connection device D2 installed in a position nearest to the mobile terminal 11 by using a measurement result of the position measurer 31 (position information of the mobile terminal 11). The position information of the non-connection device D2 is beforehand stored in the storage 37 of the mobile terminal 11, or is obtained from the application server 13.

<Second Identification Processing>

The second identification processing is processing of performing image processing to the image obtained by the camera 33, comparing it with a reference image which has been set beforehand, and identifying (specifying) the non-connection device D2. This processing is processing of reading the device tag ID and specifying the non-connection device D2. For example, the device tag ID is included in a two dimensional code (for example, QR code (registered trademark) prepared on or near the non-connection device D2) included in the image taken by the camera 33. The non-connection device D2 may be identified (specified) by using an image of the non-connection device D2 taken beforehand (or an image of the non-connection device D2 including surrounding scenery) as a reference image.

<Third Identification Processing>

The third identification processing is processing of specifying the non-connection device D2 based on data read by the NFC reader/writer 34, when the mobile terminal 11 is made to approach the NFC tag prepared on or near the non-connection device D2. The device tag ID which is set to the non-connection device D2 is stored in the NFC tag.

The work identifier DS2 identifies work contents conducted by the worker W using the mobile terminal 11. Specifically, the work identifier DS2 identifies work contents of the worker W based on information input by the worker W operating the touch panel 35. Otherwise, the work identifier DS2 obtains the work contents of the worker W from the application server 13 automatically. Here, for example, the work contents of the worker W may be information about shift of the worker W (work group, or time zone of day and night).

The user identifier DS3 identifies authority information based on authentication information and role of the worker W using the mobile terminal 11. Specifically, the user identifier DS3 identifies the authentication information and the authority information of the worker W based on user information (login information) input by the worker W operating the touch panel 35. The wireless communicator 36 transmits, to the application server 13, identification results of the identifier 38a (identification results of the device identifier DS1, the work identifier DS2, and the user identifier DS3).

The I/O processor 38b processes the information input from the touch panel 35 (input processing). Moreover, the I/O processor 38b displays a screen on the touch panel 35 (output processing). The screen generator 38c generates an information input screen which is necessary to collect the information about the non-connection device D2 by using a screen generation data transmitted from the application server 13. Then, the screen generator 38c transmits the generated information input screen to the touch panel 35 through the I/O processor 38b. The touch panel 35 displays the information input screen received from the screen generator 38c.

The screen generation data transmitted from the application server 13 is such as a device tag ID (device tag ID obtained by the device identifier DS1), newest several measurement data, a memo, image data, a screen ID, and so on. If the screen generator 38c uses Web application (HTML5), the screen generation data is transmitted from the application server 13 as structured data such as HTML and XML.

Figure 3:
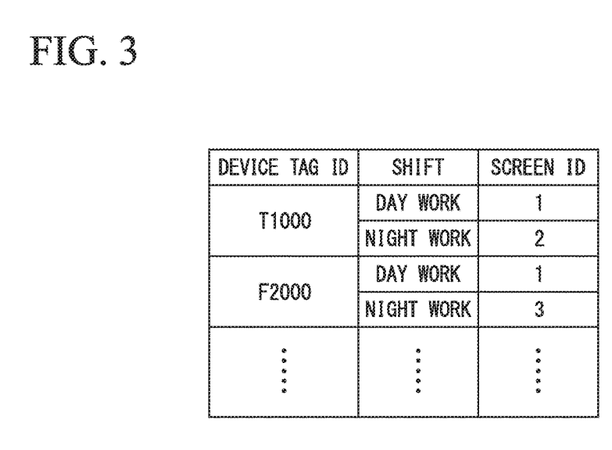
FIG. 3 is a drawing illustrating an example of the table used for generating the information input screen in an embodiment of the present invention.

Here, the screen generator 38c generates the information input screen by using a table shown in FIG. 3. FIG. 3 is a drawing illustrating an example of the table used for generating the information input screen in an embodiment of the present invention. The table shown in FIG. 3 is a table in which a device tag ID, a shift (shift of the worker W), and a screen ID are associated with each other. The screen ID is set beforehand with respect to the each information input screen which is to be displayed on the touch panel 35 of the mobile terminal 11.

In a case that the table shown in FIG. 3 is used, if the device tag ID and the shift are included in the screen generation data transmitted from the application server 13, the information input screen displayed on the touch panel 35 is specified. In a case that authority information of the worker W is added to the table shown in FIG. 3, if the device tag ID, the shift, and the authority information of the worker W are included in the screen generation data transmitted from the application server 13, the information input screen displayed on the touch panel 35 is specified.

Each block (the identifier 38a, the I/O processor 38b, and the screen generator 38c) prepared in the information processor 38 is implemented by executing one or more programs for implementing each function by an MPU (Micro-Processing Unit: microprocessor) (not shown). That is, each block prepared in the information processor 38 is implemented by cooperation of software and hardware resources.

Here, for example, the program which implements the functions is distributed in a state where the program was recorded in a recording medium such as a CD-ROM or a DVD (registered trademark)-ROM which can be read by a computer, or is distributed through an external network such as the Internet. The functions included in the information processor 38 of the mobile terminal 11 are implemented by software, by reading the program out of the recording medium and installing the program, or by installing the program downloaded through the external network.

Here, an example of the information input screen displayed on the touch panel 35 of the mobile terminal 11 will be described. FIG. 4 is a drawing illustrating an example of the information input screen in an embodiment of the present invention. The screen shown in FIG. 4A is a counter input screen, the screen shown in FIG. 4B is a numerical value input screen with unit, the screen shown in FIG. 4C is an operation time input screen, the screen shown in FIG. 4D is a state input screen, and the screen shown in FIG. 4E is a free text input screen with photograph.

Figure 4A:
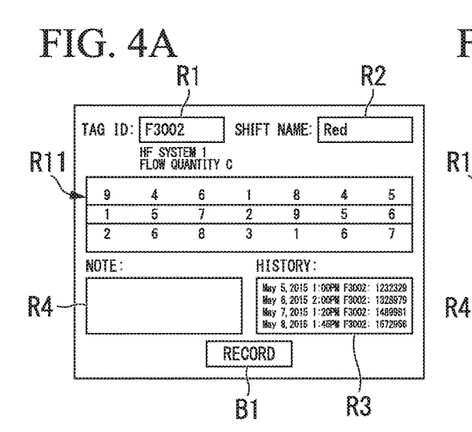
FIG. 4A is a drawing illustrating an example of the information input screen (counter input screen) in an embodiment of the present invention.

The counter input screen shown in FIG. 4A is a screen for inputting, as a measurement value, an accumulation value (counter value) which is from when the plant was operated. The accumulation value is such as an integrated value of flow quantity. As shown in FIG. 4A, a display field R1, a display field R2, a display field R3, an input field R4, and an input field R11 are arranged in the counter input screen. Tag ID (device tag ID) is displayed on the display field R1. Shift name is displayed on the display field R2. History of measurement data is displayed on the display field R3. Note (memo) is input into the input field R4. Counter value is input into the input field R11. A record button B1 for instructing to record a value input into the input field R11 is arranged in the counter input screen.

Figure 4B:
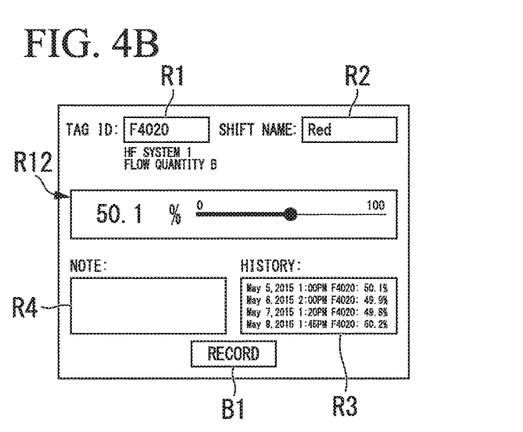
FIG. 4B is a drawing illustrating an example of the information input screen (numerical value input screen with unit) in an embodiment of the present invention.
Figure 4C:
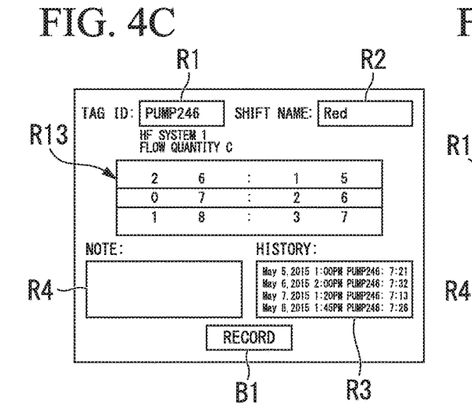
FIG. 4C is a drawing illustrating an example of the information input screen (operation time input screen) in an embodiment of the present invention.

The numerical value input screen with unit shown in FIG. 4B is a screen for showing unit and effective digit numbers according to measurement data, such as temperature and pressure, and for inputting measured value. Information such as limitation according to a threshold value, a dangerous region, and so on, is displayed in the numerical value input screen with unit. An input field R12 which can input a measurement value is arranged in the numerical value input screen with unit. The operation time input screen shown in FIG. 4C is a screen for inputting time when the non-connection device D2 was operated most recently. An input field R13 which can input operation time is arranged in the operation time input screen.

Figure 4D:
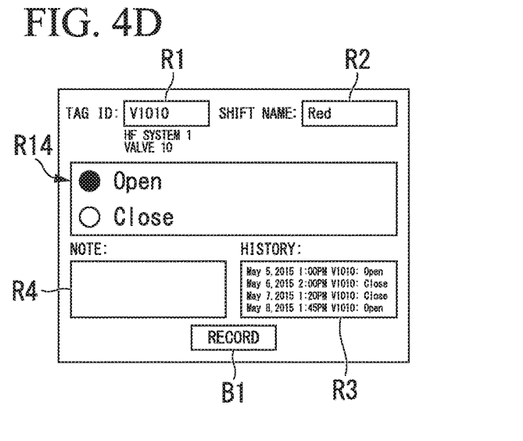
FIG. 4D is a drawing illustrating an example of the information input screen (state input screen) in an embodiment of the present invention.
Figure 4E:
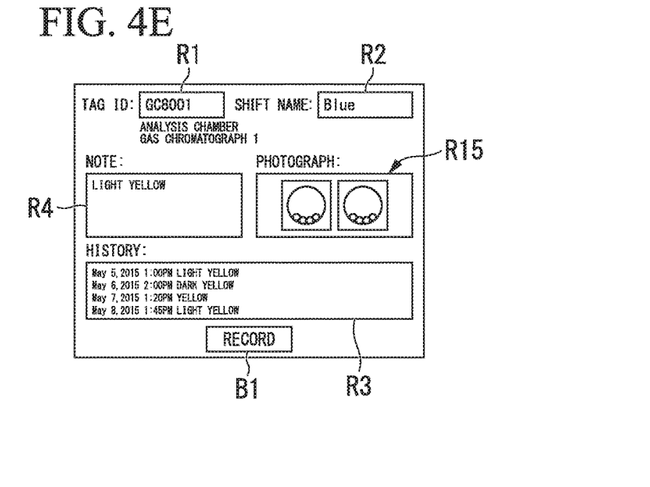
FIG. 4E is a drawing illustrating an example of the information input screen (free text input screen with photograph) in an embodiment of the present invention.

The state input screen shown in FIG. 4D is a screen for inputting a state of the non-connection device D2, such as opening and closing of a valve, a switch, and so on. An input field R14 which can select and input a state of the non-connection device D2 is arranged in the state input screen. The free text input screen with photograph shown in FIG. 4E is a screen for inputting information of the non-connection device D2 which cannot be recorded by the information input screens shown in FIG. 4A to FIG. 4D. An input field R15 which can input a photograph (image data) is arranged in the free text input screen with photograph.

Here, in the free text input screen with photograph in FIG. 4E, color is measured as a specific example of utilizing a photograph. For example, in case of only information qualitatively representing "light yellow", there is a case that other people cannot understand the color correctly. In this case, if a photograph is attached, other people can understand the measured color correctly. The display fields R1 to R3, the input field R4, and the record button B1 are arranged in the information input screen shown in FIG. 4B to FIG. 4E, like the counter input screen shown in FIG. 4A. Screen IDs which are different from each other are allocated beforehand respectively to the information input screens shown in FIG. 4A to FIG. 4E.

[Information Collection Server]

Figure 5:
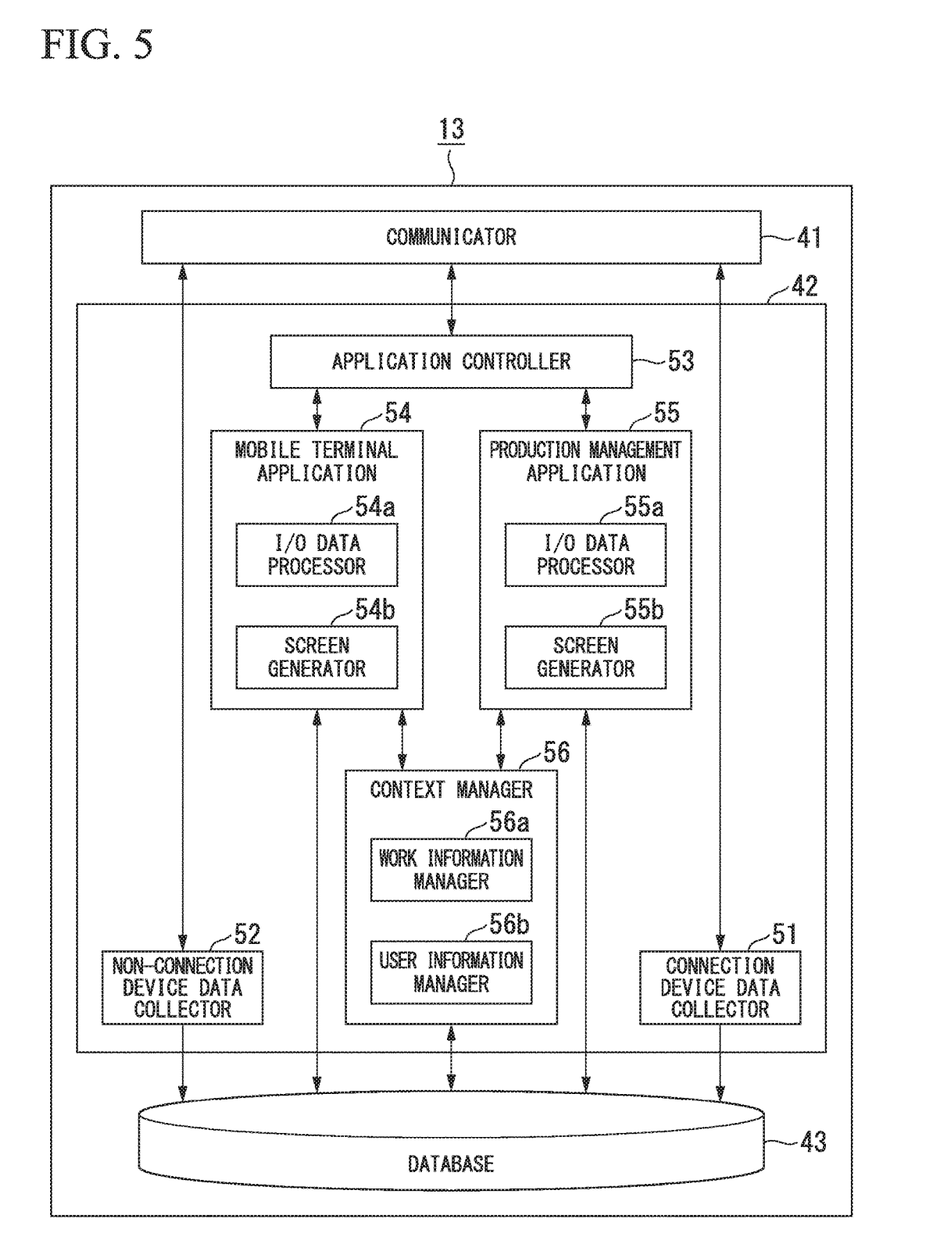
FIG. 5 is a block diagram illustrating a main configuration of the application server as an information collection server of an embodiment of the present invention.

FIG. 5 is a block diagram illustrating a main configuration of the application server as an information collection server of an embodiment of the present invention. As shown in FIG. 5, the application server 13 is equipped with a communicator 41, an information processor 42, and a database 43. The communicator 41 is connected to the intranet N2 shown in FIG. 1. The communicator 41 communicates with the mobile terminal 11, the production management client 14, the production system 20, and so on.

The information processor 42 is equipped with a connection device data collector 51 (second collector), a non-connection device data collector 52 (first collector), an application controller 53, a mobile terminal application 54, a production management application 55, and a context manager 56. The information processor 42 collects the information about the connection device D1 and the information about the non-connection device D2, and the information processor 42 manages it by using the database 43. Moreover, the information processor 42 performs processing according to a request from the mobile terminal 11 and the production management client 14, and the information processor 42 provides data obtained by this processing to the mobile terminal 11 and the production management client 14 respectively.

The connection device data collector 51 collects the information about the connection device D1 from the production system 20 periodically or non-periodically. For example, the connection device data collector 51 communicates with a controller (not shown), which is a main part of the DCS 21 which is a kind of the production system 20, in conformity with a standard such as OPC (OLE for Process Control), to collect the information about the connection device D1. The non-connection device data collector 52 collects the data about the non-connection device D2 transmitted from the mobile terminal 11 through the wireless network N1 and the intranet N2. For example, the non-connection device data collector 52 communicates with the mobile terminal 11 by using a general technology, such as a Web Service, or a dedicated communication protocol.

The application controller 53 controls transaction with respect to the mobile terminal 11 or the production management client 14. If a Web server is used by the application server 13, the application controller 53 is realized by executing a program of the Web server and its circumference program.

The mobile terminal application 54 is equipped with an I/O data processor 54a and a screen generator 54b. The mobile terminal application 54 processes a request from the mobile terminal 11, and returns data obtained by this processing to the mobile terminal 11. For example, at a time of user authentication, the I/O data processor 54a of the mobile terminal application 54 receives a login request from the mobile terminal 11. Thereafter, the I/O data processor 54a obtains necessary information from the context manager 56, and returns an authentication result to the mobile terminal 11. For example, if the request from the mobile terminal 11 is a send request of the information about the non-connection device D2, the I/O data processor 54a obtains necessary data from the database 43, and returns the obtained data to the mobile terminal 11.

The screen generator 54b of the mobile terminal application 54 generates an information input screen according to the identification result (identification result of the identifier 38a) transmitted from the mobile terminal 11. The touch panel 35 of the mobile terminal 11 displays the generated information input screen. For this reason, the screen generator 54b transmits, to the mobile terminal 11, screen generation data which is necessary to generate the information input screen which is to be displayed on the touch panel 35 of the mobile terminal 11.

For example, the screen generator 54b transmits, to the mobile terminal 11, a device tag ID (device tag ID obtained by the device identifier DS1 of the mobile terminal 11), newest several measurement data, a memo, image data, a screen ID, and so on, as the screen generation data. Here, the same table as the table shown in FIG. 3 is prepared in the screen generator 54b. In a case of using Web application (HTML5), the screen generator 54b transmits structured screen generation data such as HTML and XML to the mobile terminal 11.

The production management application 55 is equipped with an I/O data processor 55a and a screen generator 55b. The production management application 55 processes a request from the production management client 14, and returns data obtained by this processing to the production management client 14. For example, like the mobile terminal application 54 described above, the production management application 55 processes requests from the production management clients 14, such as a user authentication request and a data obtaining request, and returns data obtained by this processing to the production management client 14. Although the production management application 55 performs almost the same processing as the mobile terminal application 54, the transmitted/received data and contents of the screen are different.

The context manager 56 has a work information manager 56a and a user information manager 56b. The context manager 56 performs processing and management of information about a user authentication of a system user of the mobile terminal 11 and production management client 14, and work contents. By performing the authentication, access control (control of a screen displayed according to a user's authority and obtained data) and context awareness (change of a display screen according to a shift of the worker W and work contents) can be implemented.

Information for specifying an access right and work contents is necessary for implementing the access control and the context awareness. In the present embodiment, the information is specified beforehand and managed by the context manager 56 of the application server 13. A function for storing data about the information and automating the change by using machine learning may be mounted.

The database 43 unifies and manages the information about the connection device D1 collected by the connection device data collector 51 and the information about the non-connection device D2 collected by the non-connection device data collector 52. For example, the database 43 is implemented by a relational database. For example, the information managed by the database 43 includes a device tag ID, a measurement time, measurement data, position information, a memo, image data, a screen ID, and so on.

Each block (the application controller 53, the mobile terminal application 54, the production management application 55, and the context manager 56) prepared in the information processor 42 is implemented by executing one or more programs for implementing each function by an MPU (not shown). That is, each block prepared in the information processor 42 is implemented by cooperation of software and hardware resources.

Here, for example, the program which implements the functions is distributed in a state where the program was recorded in a recording medium such as a CD-ROM or a DVD (registered trademark)-ROM which can be read by a computer or is distributed through an external network such as the Internet. The functions prepared in the information processor 42 of the application server 13 are implemented by software, by reading the program out of the recording medium and installing the program, or by installing the program downloaded through the external network.

[Production Management Client]

Figure 6:
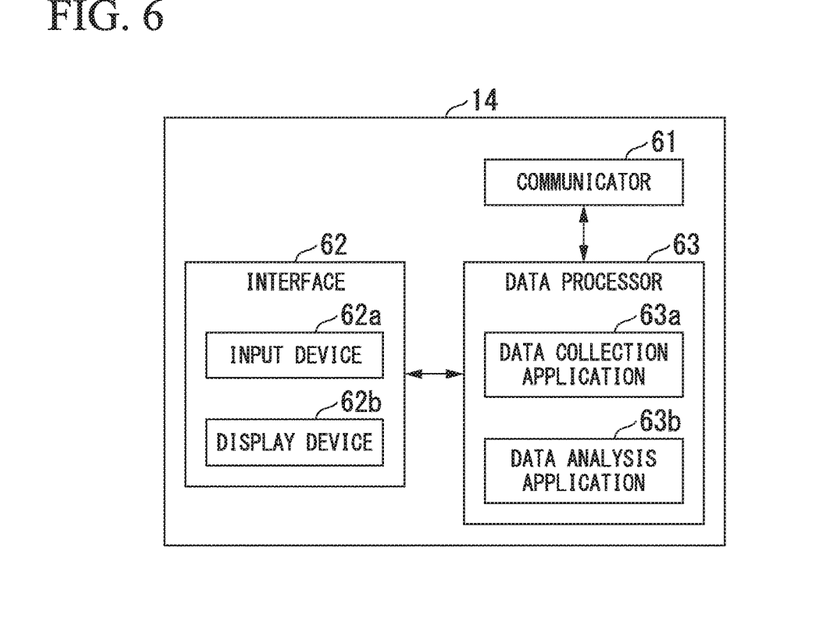
FIG. 6 is a block diagram illustrating a main configuration of the production management client used by the information collection system of an embodiment of the present invention.

FIG. 6 is a block diagram illustrating a main configuration of the production management client used by the information collection system of an embodiment of the present invention. As shown in FIG. 6, the production management client 14 is equipped with a communicator 61, an interface 62, and a data processor 63. The communicator 61 is connected to the intranet N2 shown in FIG. 1. The communicator 61 communicates with the application server 13.

The interface 62 is equipped with an input device 62a and a display device 62b. The interface 62 is a user interface which inputs instructions of the manager M and provides various types of information to the manager M. For example, the input device 62a is equipped with a keyboard, a mouse, and so on. For example, the display device 62b is equipped with a liquid crystal display, an organic EL display, or the like.

The data processor 63 is equipped with a data collection application 63a and a data analysis application 63b. The data processor 63 performs various instructions in accordance with a request transmitted from the communicator 61 or instructions input from the input device 62a of the interface 62. The data collection application 63a is software which accesses the application server 13 and collects data required for production management work. The data analysis application 63b is software for performing analysis work by using data collected by the data collection application 63a. The data analysis application 63b may be general commercial spreadsheet software or dedicated software.

Each block (the data collection application 63a and the data analysis application 63b) prepared in the data processor 63 is implemented by executing one or more programs for implementing each function by an MPU (not shown). That is, each block prepared in the data processor 63 is implemented by cooperation of software and hardware resources.

Here, for example, the program which implements the functions is distributed in a state where the program was recorded in a recording medium such as a CD-ROM or a DVD (registered trademark)-ROM which can be read by a computer, or is distributed through an external network such as the Internet. The functions prepared in the data processor 63 of the production management client 14 are implemented by software, by reading the program out of the recording medium and installing the program, or by installing the program downloaded through the external network.

Figure 7:
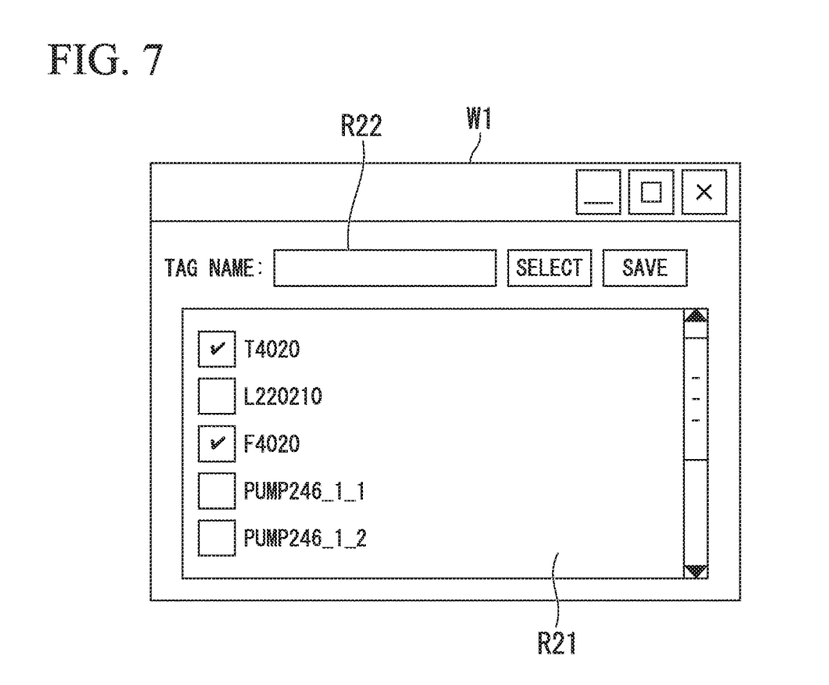
FIG. 7 is a drawing illustrating an example of the production management data obtaining screen in an embodiment of the present invention.

Here, an example of a production management data obtaining screen displayed on the display device 62b of the production management client 14 is described. FIG. 7 is a drawing illustrating an example of the production management data obtaining screen in an embodiment of the present invention. A display field R21 and an input field R22 are arranged in the production management data obtaining screen W1 shown in FIG. 7. A list of tag names (device tag names) is displayed in the display field R21. A tag name is input into the input field R22.

A list of tag names of the connection device D1 and the non-connection device D2 of which data can be obtained from the application server 13 is displayed in the display field R21. As shown in FIG. 7, a check box is arranged near the each tag name displayed in the display field R21. The production management client 14 obtains, from the application server 13, data of the connection device D1 or the non-connection device D2, of which tag name is checked in a check box among tag names displayed in the display field R21.

Since information obtained from the connection device D1 and information obtained from the non-connection device D2 are displayed in the display field R21 without being distinguished, the manager M who operates the production management client 14 can obtain the information obtained from the connection device D1 and the information obtained from the non-connection device D2 by the same operation. When searching a specific tag name from the tag names displayed as a list in the display field R21, a tag name which is necessary to be searched is input into the input field R22.

[Information Collection Method]

Next, operation of the information collection system 1 will be described. First, an outline of whole operation of the information collection system 1 will be described below. Thereafter, details of the operation (information collecting operation) of collecting data from the non-connection device D2, which is performed by the information collection system 1, will be described.

<Whole Operation>

Figure 8:
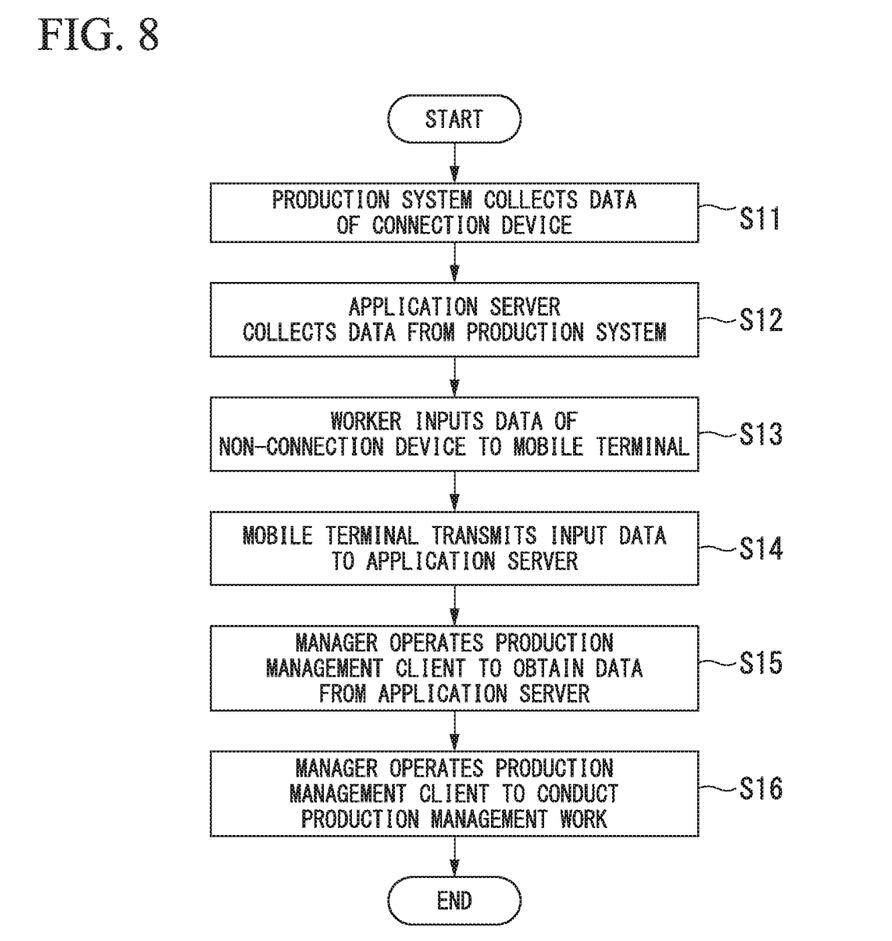
FIG. 8 is a flow chart illustrating an outline of the whole operation of the information collection system of an embodiment of the present invention.

FIG. 8 is a flow chart illustrating an outline of the whole operation of the information collection system of an embodiment of the present invention. As shown in FIG. 8, the production system 20 repeatedly performs operation of collecting data of the connection device D1 in the plant (Step S11). The data collected by the production system 20 is sequentially stored in the production system 20. While the operation is performed, the connection device data collector 51 of the application server 13 performs operation of collecting data stored in the production system 20 periodically or non-periodically (Step S12).

In the plant, the worker W who conducts maintenance work inputs, into the mobile terminal 11, data represents a state of the non-connection device D2 (Step S13). For example, the worker W reads an indicated value of an analog instrument (the non-connection device D2) prepared in the plant, and the worker W inputs the read indicated value into the mobile terminal 11. The worker W conducts the maintenance work several times in a day.

If this work has been conducted, the data input into the mobile terminal 11 is transmitted (uploaded) to the application server 13 (Step S14). The non-connection device data collector 52 of the application server 13 collects the uploaded data. The data collected at Step S14 is unified with the data of the connection device D1 collected at Step S12, and is managed by the database 43 of the application server 13.

When a production management work is conducted, the manager M operates the production management client 14 to access the application server 13 and obtain necessary data (Step S15). Thereafter, the manager M operates the production management client 14 to conduct the production management work by using the data obtained at Step S15 (Step S16). The operation (Step S12), in which the application server 13 collects the data stored in the production system 20, is performed before the data is unified with the data of the connection device D1.

<Information Collecting Operation>

Figure 9:
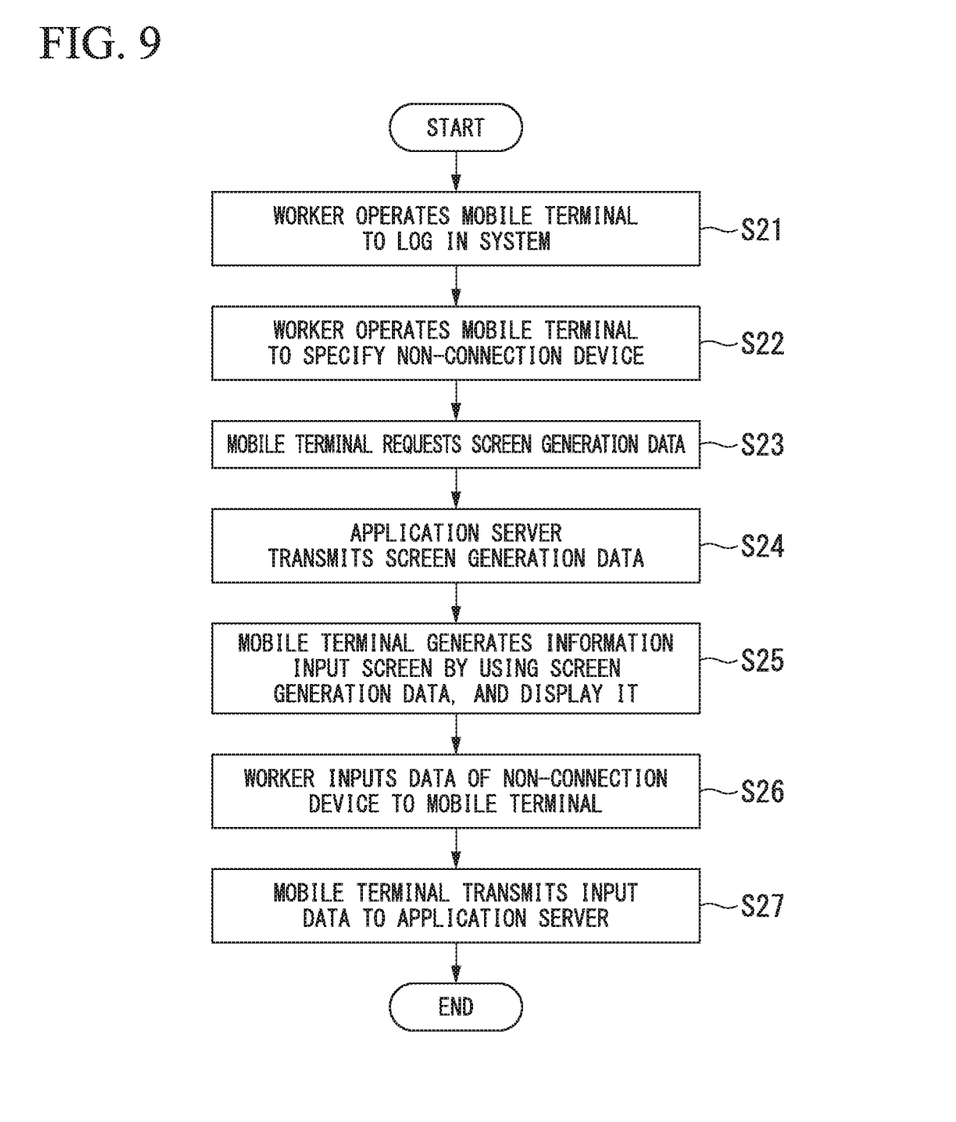
FIG. 9 is a flow chart illustrating details of the information collecting operation performed by the information collection system of an embodiment of the present invention.

FIG. 9 is a flow chart illustrating details of the information collecting operation performed by the information collection system of an embodiment of the present invention. The flow chart shown in FIG. 9 shows details of the operation performed at Step S13 and Step S14 in FIG. 8. If the worker W inputs data of the non-connection device D2 into the mobile terminal 11 (in other words, if the work of Step S13 in FIG. 8 is conducted), first, the worker W operates the mobile terminal 11 to log in the information collection system 1 from a login screen of the mobile terminal 11 (Step S21).

In addition to a user name and a password, for example, an input field of a shift name is prepared in the login screen of the mobile terminal 11. The worker W inputs own user name, password, and a shift name into the input field to log in the information collection system 1. Here, login authentication is performed by accessing the application server 13 from the mobile terminal 11. However, if the authentication information of the worker W is stored in the mobile terminal 11, the mobile terminal 11 may perform the login authentication.

If the login to the information collection system 1 is completed, the worker W operates the mobile terminal 11 to specify the non-connection device D2 (Step S22). For example, if the NFC tag is arranged near the non-connection device D2, the worker W makes the NFC reader/writer 34 of the mobile terminal 11 approach to the NFC tag. Thereafter, the NEC reader/writer 34 obtains a device tag ID (specification information) stored in the NFC tag. On the other hand, for example, if a two dimensional code is attached to the non-connection device D2, the camera 33 of the mobile terminal 11 reads the two dimensional code.

If the device tag ID of the non-connection device D2 is obtained, the mobile terminal 11 requests transmission of the screen generation data to the application server 13 (Step S23). Specifically, the mobile terminal 11 transmits the device tag ID obtained at Step S22 by to the application server 13. Thereby, the mobile terminal 11 requests the transmission of the screen generation data which is necessary to display the information input screen according to the device tag ID on the touch panel 35.

If the screen generator 54b of the application server 13 has received the transmission request from the mobile terminal 11, the screen generator 54b specifies an information input screen which is to be displayed on the touch panel 35 of the mobile terminal 11. Specifically, the screen generator 54b specifies a screen ID according to the device tag ID transmitted from the mobile terminal 11 and the shift name transmitted in advance of the device tag ID, for example, by using the table shown in FIG. 3. Thereafter, the screen generator 54b transmits, to the mobile terminal 11, screen generation data which is necessary to generate the specified information input screen (Step S24).

If the wireless communicator 36 of the mobile terminal 11 has received the screen generation data transmitted from the application server 13, the screen generator 38c of the mobile terminal 11 generates the information input screen by using the screen generation data, and displays the generated information input screen on the touch panel 35 (Step S25). Thereby, for example, one of the information input screens shown in FIG. 4A to FIG. 4E is displayed on the touch panel 35 of the mobile terminal 11.

If an information input screen has been displayed, the worker W inputs, into the mobile terminal 11, data representing a state of the non-connection device D2 (Step S26). For example, the worker W reads an indicated value of an analog instrument (the non-connection device D2) prepared in the plant, and inputs the read indicated value into the mobile terminal 11.

If the work has been conducted, the data input into the mobile terminal 11 is transmitted (uploaded) to the application server 13 (Step S27). If the mobile terminal 11 cannot access the application server 13 because of a bad state of electric wave, the data input into the mobile terminal 11 cannot be uploaded to the application server 13. In this case, for example, the worker W moves to a position where the mobile terminal 11 can access the application server 13. Thereby, the data input into the mobile terminal 11 can be uploaded to the application server 13.

The non-connection device data collector 52 of the application server 13 collects the uploaded data. The data collected by the non-connection device data collector 52 is unified with the data collected by the connection device data collector 51, and is managed by the database 43 of the application server 13.

As described above, the present embodiment, the device tag ID of the non-connection device D2 is obtained by using at least one of the position measurer 31, the posture detector 32, the camera 33, and the NFC reader/writers 34 which are prepared in the mobile terminal 11, the information input screen according to the obtained device tag ID is displayed on the touch panel 35 of the mobile terminal 11, and the input information which has been input into the information input screen is transmitted to the wireless network N1. Thereafter, the application server 13 collects the input information transmitted from the mobile terminal 11 through the wireless network N1. Thereby, the information collection system 1 of the present embodiment can prevent unnecessary cost and a human error, and can collect information of the non-connection device installed in the plant.

Specifically, effects described below can be obtained.

(1) Improving efficiency of production management work and data collection work in the field.

Inefficient work which takes a long time for the worker W and the manager M, such as recording measurement data to a paper medium, inputting to a computer, checking an unclear point orally, and so on, can be reduced. Thereby, working hours can be shortened.

(2) Preventing mistake of a worker in recording data.

As shown in FIG. 4A to FIG. 4E, the display field R3 in which history of measurement data is displayed is arranged in the information input screen displayed on the touch panel 35 of the mobile terminal 11. For this reason, since the worker W can check the past input history in the field, input mistake can be prevented. If an automatic check function of checking upper and lower limits of input data is prepared, input mistake can be prevented more certainly.

(3) Facilitating data management.

Since the database 43 manages data, which is relevant to production and quality, including the data of the non-connected device D2 in addition to the data of the connected device D1, analysis of production in several months or one year and analysis of quality data can be performed easily.

Although an information collection system, an information collection terminal device, an information collection server, and an information collection method according to embodiments of the present invention have been described above, the present invention is not restricted to the above-described embodiments, and can be freely modified within the scope thereof.

For example, in the above-described embodiment, the mobile terminal 11 generates the information input screen (screen which is necessary to collect the data of the non-connection device D2) by using the screen generation data from the application server 13, and displays the generated information input screen on the touch panel 35. However, the mobile terminal 11 may generate the information input screen by itself without using the screen generation data from the application server 13, and may display it on the touch panel 35. If the mobile terminal 11 displays the information input screen by itself, the screen generator 38c may generate the information input screen by using the identification result of the identifier 38a, and may display the generated information input screen on the touch panel 35. In this case, there is no need to transmit the identification result of the identifier 38a to the application server 13.

In the above-described embodiment, an example that the position measurer 31, the posture detector 32, the camera 33, and the NFC reader/writer 34 are prepared in the mobile terminal 11 has been described. However, there is no need that all of them are prepared in the mobile terminal 11, and at least one of them may be prepared in the mobile terminal 11. The measurers 31, the posture detector 32, the camera 33, and the NFC reader/writer 34 may be built in the mobile terminal 11, and may also be an external device.

In the above-described embodiment, although an example of collecting the information about the non-connection device which is not connected to the production system 20 of the plant, the present invention can be applied to a plant other than a plant (for example, an oil relining plant and a chemical plant), a factory, an institution, there the production system 20 is installed. For example, the present invention can be also applied to an electric power plant, a factory field, a production field in extreme environment such as a platform on ocean, an installation field of a windmill or photovoltaic generation, a building, wide-area infrastructures of a road and a rail line. That is, the present invention can be applied universally in a case that both systematized data collection and manual data collection exist.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An information collection system comprising:
   an information collection terminal which comprises:
      an obtainer which is implemented by a hardware-processor of the information collection terminal and configured to obtain first specification information for specifying a non-connection device which is not connected to a system which is capable of collecting information;
      a screen generator which is implemented by the hardware-processor of the information collection terminal and configured to generate an information input screen for inputting information of the non-connection device;
      a display configured to display the information input screen generated by the screen generator;
      an input device configured to input the information of the non-connection device into the information input screen displayed by the display;
      a communicator which is a communication device which communicates wirelessly in conformity with a wireless communication standard and configured to transmit, to a network, input information which has been input into the information input screen by the input device; and
   an information collection server which comprises:

a first collector which is implemented by a hardware-processor of the information collection server and configured to collect the input information transmitted from the information collection terminal through the network, wherein the information collection terminal further comprises a work identifier which is implemented by the hardware-processor of the information collection terminal and configured to identify work contents conducted by a worker using the information collection terminal, and wherein the screen generator is configured to generate the information input screen in accordance with the first specification information obtained by the obtainer and the work contents identified by the work identifier by using a table in which the first specification information, the work contents, and second specification information for specifying the information input screen are associated with each other, and the screen generator is configured to display the information input screen on the display.

2. The information collection system according to claim 1, wherein the information collection terminal is configured to transmit the specification information obtained by the obtainer to the information collection server; and wherein the information collection server further comprises another screen generator configured to display, on the display of the information collection terminal, the information input screen according to the specification information transmitted from the information collection terminal.

3. The information collection system according to claim 2, wherein the another screen generator is configured to display, on the display, the information input screen according to the specification information obtained by the obtainer and at least one of user specification information for specifying a user who operates the information collection terminal and the work contents.

4. The information collection system according to claim 1, wherein the obtainer comprises:
an image obtainer configured to obtain an image; and
a reader configured to read the specification information from the image obtained by the image obtainer.

5. The information collection system according to claim 1, wherein the obtainer comprises a short-distance communicator configured to obtain the specification information by performing short-distance communication with an external device.

6. The information collection system according to claim 1, wherein the obtainer comprises a position information obtainer configured to obtain position information representing a position of a self-terminal, and wherein the obtainer is configured to obtain the specification information based on the position information obtained by the position information obtainer and the position information of the non-connection device.

7. The information collection system according to claim 1, wherein the information collection server comprises:
a second collector configured to collect information of a connection device which is connected to a system which is capable of collecting information; and
a database configured to unify and manage the information collected by the first collector and the information collected by the second collector.

8. The information collection system according to claim 1, further comprising:

a production management terminal configured to access the information collection server, the production management terminal being used for performing analysis which is necessary for production management.

9. An information collection terminal comprising:

an obtainer which is implemented by a hardware-processor of the information collection terminal and configured to obtain first specification information for specifying a non-connection device which is not connected to a system which is capable of collecting information;

a screen generator which is implemented by the hardware-processor of the information collection terminal and configured to generate an information input screen for inputting information of the non-connection device; and a display configured to display the information input screen generated by the screen generator;

an input device configured to input the information of the non-connection device into the information input screen displayed by the display; and a communicator which is a communication device which communicates wirelessly in conformity with a wireless communication standard and configured to transmit, to a network, input information which has been input into the information input screen by the input device, wherein the information collection terminal further comprises a work identifier which is implemented by the hardware-processor of the information collection terminal and configured to identify work contents conducted by a worker using the information collection terminal, and wherein the screen generator is configured to generate the information input screen in accordance with the first specification information obtained by the obtainer and the work contents identified by the work identifier by using a table in which the first specification information, the work contents, and second specification information for specifying the information input screen are associated with each other, and the screen generator is configured to display the information input screen on the display.

10. The information collection terminal according to claim 9, wherein the screen generator is configured to display, on the display, the information input screen according to the specification information obtained by the obtainer and at least one of user specification information for specifying a user who operates the information collection terminal and the work contents.

11. The information collection terminal according to claim 9, wherein the obtainer comprises:
an image obtainer configured to obtain an image; and
a reader configured to read the specification information from the image obtained by the image obtainer.

12. The information collection terminal according to claim 9, wherein the obtainer comprises a short-distance communicator configured to obtain the specification information by performing short-distance communication with an external device.

13. The information collection terminal according to claim 9,
wherein the obtainer comprises a position information obtainer configured to obtain position information representing a position of a self-terminal, and
wherein the obtainer is configured to obtain the specification information based on the position information obtained by the position information obtainer and the position information of the non-connection device.

14. An information collection server comprising:
a screen generator configured to display, on a display of an information collection terminal, an information input screen in accordance with first specification information and work contents, the first specification information being for specifying a non-connection device which is not connected to a system which is capable of collecting information, the first specification information being obtained by the information collection terminal, the work contents being conducted by a worker using the information collection terminal, the work contents being identified by the information collection terminal; and
a first collector configured to collect input information which has been input into the information input screen and transmitted from the information collection terminal through the network,
wherein the screen generator is configured to generate the information input screen in accordance with the first specification information and the work contents identified by using a table in which the first specification information, the work contents, and second specification information for specifying the information input screen are associated with each other, and the screen generator is configured to display the information input screen on the display.

15. The information collection server according to claim 14, further comprising:
a second collector configured to collect information of a connection device which is connected to a system which is capable of collecting information; and
a database configured to unify and manage the information collected by the first collector and the information collected by the second collector.

16. An information collection method comprising:
obtaining, by an information collection terminal, first specification information for specifying a non-connection device which is not connected to a system which is capable of collecting information;
generating, by the information collection terminal, an information input screen for inputting information of the non-connection device;
displaying, by the information collection terminal, the information input screen generated by the information collection terminal;
inputting, by the information collection terminal, information of the non-connection device into the information input screen;
collecting, by an information collection server, the input information which is input into the information input screen;
identifying, by the information collection terminal, work contents conducted by a worker using the information collection terminal;
generating, by the information collection terminal, the information input screen in accordance with the first specification information obtained by the information collection terminal and the work contents identified by the information collection terminal by using a table in which the first specification information, the work contents, and second specification information for specifying the information input screen are associated with each other; and
displaying, by the information collection terminal, the information input screen on the display.

17. The information collection method according to claim 16, further comprising:
collecting, by the information collection server, information of a connection device which is connected to a system which is capable of collecting information; and
unifying and managing, by the information collection server, the information of the non-connection device and the information of the connection device.

18. The information collection method according to claim 16, further comprising:
accessing, by a production management terminal, the information collection server; and
performing, by the production management terminal, analysis which is necessary for production management.

* * * * *